(12) United States Patent
Villeneuve

(10) Patent No.: US 10,081,146 B2
(45) Date of Patent: Sep. 25, 2018

(54) DEMOLDABILITY PREDICTION MODEL

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Bernard Villeneuve, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 187 days.

(21) Appl. No.: 15/128,587

(22) PCT Filed: Feb. 27, 2015

(86) PCT No.: PCT/FR2015/050470
§ 371 (c)(1),
(2) Date: Sep. 23, 2016

(87) PCT Pub. No.: WO2015/145004
PCT Pub. Date: Oct. 1, 2015

(65) Prior Publication Data
US 2017/0106612 A1   Apr. 20, 2017

(30) Foreign Application Priority Data

Mar. 24, 2014 (FR) .................................... 14 52449

(51) Int. Cl.
*B29C 37/00* (2006.01)
*B29D 30/06* (2006.01)

(52) U.S. Cl.
CPC ...... *B29D 30/0662* (2013.01); *B29C 37/0003* (2013.01); *B29C 2037/903* (2013.01); *B29D 2030/0665* (2013.01)

(58) Field of Classification Search
CPC .......... B29C 37/0003; B29C 2037/903; B29D 30/0662
See application file for complete search history.

(56) References Cited

FOREIGN PATENT DOCUMENTS

| JP | 2012006287 A | 1/2012 |
|----|--------------|--------|
| JP | 2012096462 A | 5/2012 |

*Primary Examiner* — James Sanders
(74) *Attorney, Agent, or Firm* — Dickinson Wright PLLC

(57) ABSTRACT

The demoldability prediction model includes the steps of choosing a mold specimen; choosing a reference material; measuring the force $F_0$ for demolding the reference material from the mold specimen; determining the force $M_0$ for demolding the reference material from the control test specimen; selecting a material to be measured; determining the force M for demolding the material from the control test specimen; calculating the ratio of the forces $M_0$ for demolding the reference material and M for demolding the material from the control test specimen so as to define a coefficient C of material impact; and calculating the force F for demolding the material such that $F = C \times F_0$.

7 Claims, 2 Drawing Sheets

DEMOLDABILITY PREDICTION MODEL

CROSS-REFERENCE TO RELATED APPLICATIONS

The present invention claims priority to PCT International Patent Application Serial No. PCT/FR2015/050470 filed Feb. 27, 2015 entitled "Demoldability Prediction Model," which claims the benefit of FR Patent Application Serial No. 1452449 filed Mar. 24, 2014, the entire disclosures of the applications being considered part of the disclosure of this application and hereby incorporated by reference.

BACKGROUND OF THE INVENTION

1. Field of the Invention

The present invention relates to a method for evaluating the force for demoulding a tire from a given mold, and more particularly a method for predicting the demoldability of new tread patterns combined with new materials.

2. Related Art

New ranges of tires have to comply with a functional specification based on performance requirements such as adherence, rolling resistance, noise, etc. However, these new ranges also have to have a lowest impact as possible on the cost of manufacturing the tires.

The manufacturing cost comprises the raw materials used, the labor costs for producing the green casings which will make up the tire and also the labor costs for the curing station (time necessary for the vulcanization of the green casing and time necessary for opening the curing mold), and the longer the time necessary for opening the press in which the mold is placed, the less time remains for curing the green casings. In extreme cases, it is impossible to demold the casing after curing.

New tire tread patterns are increasingly complex, thereby increasing the demolding time. Being able to anticipate the demoldability of these new tread patterns avoids a situation in which solutions that are too time-consuming post-curing and are thus too expensive are put on the market. Therefore, there is a need for a predictive tool which would avoid the production of curing molds, the use of which in a plant would not be acceptable from an industrial point of view.

It is possible to produce a curing mold having the new tread pattern and to measure the forces necessary for counteracting the adhesion generated between this curing mold and the green casing during the curing phase. In order to be able to assess the demoldability of new tread patterns, it is possible to produce mold portions with the various tread patterns to be evaluated and to measure, by virtue of a dynamometric axle mounted on each different portion, the forces necessary to overcome the adhesion generated during curing for each solution. However, the major drawback of this solution is that it is necessary to produce the equivalent of a complete mold, this representing a fairly high cost for an exploratory method.

Use can be made of the know-how of operational staff, but this has the consequence that subjective limitations (based on feeling and not on experiments) risk greatly penalizing the definition of new tread patterns and thus having a negative effect on the desired performance requirements.

Patent JP 2012 006 287 discloses a method and a means for assessing, from a portion of tread pattern elements, the forces necessary for the demoldability of tread pattern elements that are more consistent while limiting the cost. That patent describes a method using a "test specimen" that is representative of a part of the tread pattern chosen in the most restrictive region of the complete mold, and the forces necessary for overcoming the adhesion generated on the test specimen are measured in order then to transpose it to larger parts.

However, the adhesion of the green casing to the mold which arises during the curing phase is dependent on a large number of parameters which are difficult to assess as a whole. If the geometric aspect of the tread pattern: dimensions and intrusive geometry, is partially taken into account in this prior art, the impact of the materials used (green casing and mold) is not taken into account. Thus, the physicochemical interactions that arise during the curing phase, the nature of the materials used, their rigidity and the rubbing of the casing against the mold during demolding are not measured.

The composition of the materials of tires is changing rapidly and the nature of the constituents can have a non-negligible effect on the demolding forces. Thus, with one and the same tread pattern, the simple fact of changing the materials of the tires can have a significant impact on demoldability.

SUMMARY OF THE INVENTION AND ADVANTAGES

The object of the present disclosure is to propose a method which makes it possible to take into account the material in the evaluation of the demoldability of a tire from the mold.

The method for evaluating a force for mold a tire from a mold according to the disclosure consists in measuring the force for demolding a material from a mold specimen and a control test specimen, said method including:
- a step of choosing a mold specimen,
- a step of choosing a reference material,
- a step of measuring the force $F_0$ for demolding the reference material from the mold specimen,
- a step of determining the force $M_0$ for demolding the reference material from the control test specimen,
- a step of selecting a material to be measured,
- a step of determining the force M for demolding the material from the control test specimen,
- a step of calculating the ratio of the forces $M_0$ for demolding the reference material and M for demolding the material from the control test specimen so as to define a coefficient C of material impact,
- a step of calculating the force F for demolding the material such that $F = C \times F_0$.

The mold specimen is a control mold of which the characteristics and the maximum force for detaching a given material which will be the reference material are known. A comparison is carried out of an existing tread pattern and the new tread pattern with the reference material, and the two solutions are compared: the control and the new tread pattern.

In order to limit the disparity in the results, the choice of the control molds should be representative of the use of the mold having the new tread pattern: similar curing press, same category of casing (passenger vehicle, heavy goods vehicle, road-type, winter, etc.).

According to an additional feature, it comprises a step of measuring a second mold specimen such that the force $M_1$ for demolding from this second specimen is greater than the force $M_0$. This constitutes an experimental design which makes it possible to assess the forces for demolding from the different types of molds and thus of tread patterns.

Advantageously, the demolding force $M_0$ constitutes a lower limit and the force $M_1$ constitutes an upper limit. Each limit is formed by a specimen of a top control mold for which the demolding force is high and which represents the limit not to be exceeded, and a specimen of a bottom control mold for which the forces are acceptable in a plant from an industrial point of view.

According to another feature, the evaluation of the force for demolding a second material is limited to the following steps of:
  determining the force M' for demolding the second material from the control test specimen,
  calculating the ratio of the forces $M_0$ for demolding the second control material and M' for demolding the second material from the control test specimen so as to define a coefficient C' of material impact,
  calculating the force F' for demolding the second material such that $F'=C' \times F_0$.

Thus, the other materials will be measured only by measuring the force for demolding each of the other materials from the control test specimen. This control test specimen is fairly simple since only the demoldability force of the material is measured, without taking into account the tread pattern of the tire. The cost of this measurement is thus low.

The subject of the disclosure is also a device for selecting a material/mold pair, which comprises a mold specimen, a control test specimen, a force measuring device and a calculating means, and which uses the method having the above features. Preferably, the mold specimen is chosen from a region of the mold where the demolding force is greatest. This makes it possible to measure the force at the location at which this is most industrially unfavourable. The control test specimen is fairly easy to produce; it has a substantially rectangular, planar shape and has simply a recess in which the force for demolding the material is measured.

Another subject of the disclosure is a computer program for selecting a material/mold pair, which comprises the following instructions:
  a step of choosing a mold specimen,
  a step of choosing a reference material,
  a step of measuring the force $F_0$ for demolding the reference material from the mold specimen,
  a step of determining the force $M_0$ for demolding the reference material from the control test specimen,
  a step of selecting a material to be measured,
  a step of determining the force M for demolding the material from the control test specimen,
  a step of calculating the ratio of the forces $M_0$ for demolding the reference material and M for demolding the material from the control test specimen so as to define a coefficient C of material impact,
  a step of calculating the force F for demolding the material such that $F=C \times F_0$.

Another subject of the disclosure is also the use of the method for selecting a material/mold pair such that the force F for demolding the material is less than a predetermined demolding force.

BRIEF DESCRIPTION OF THE DRAWING

Further advantages may also become apparent to a person skilled in the art from reading the following examples, which are illustrated by the appended figures and given by way of illustration.

DETAILED DESCRIPTION OF THE ENABLING EMBODIMENT

Figure 1:
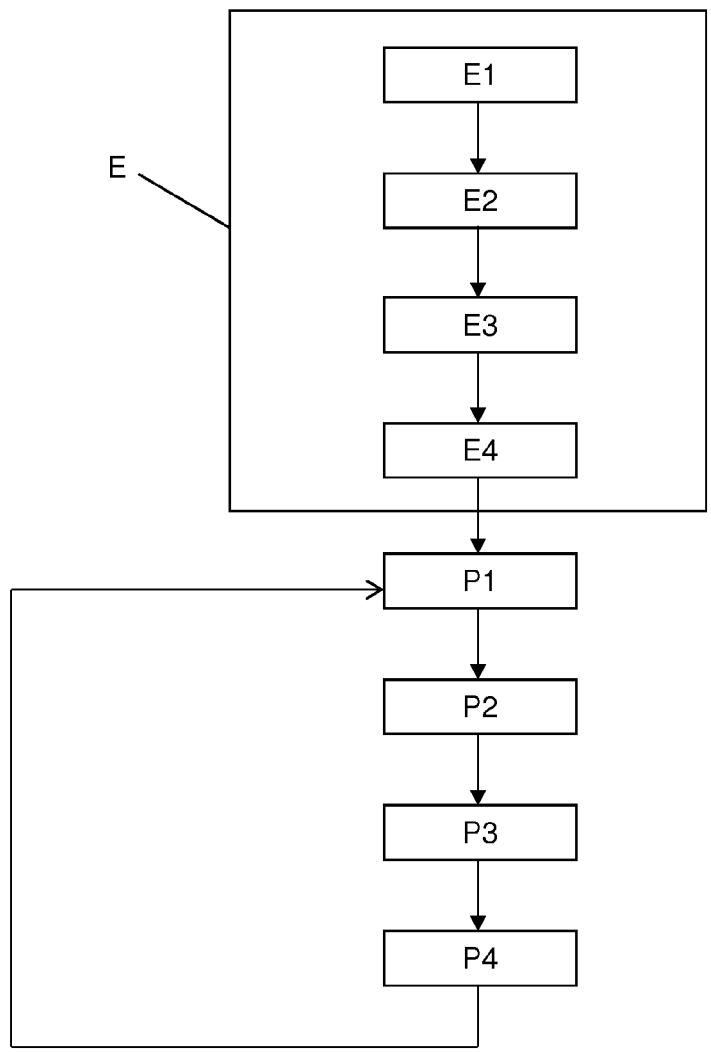
FIG. 1 shows a flowchart of the steps in a method for evaluating the force for demolding a tire.

FIG. 1 shows a flowchart of the steps in the method for evaluating the force for demolding a tire from a mold.

The method includes a step E of determining, for a reference material 6, the forces $F_0$ for demolding from a mold and $M_0$ from a control test specimen 3. This step E comprises a substep E1 of defining a mold specimen 2 from a curing mold for a tire, a substep E2 of choosing a reference material 6, a substep E3 of measuring the force $F_0$ for demolding the reference material 6 from the mold specimen 2, and a substep E4 of determining the force $M_0$ for demolding the reference material 6 from the control test specimen 3.

This step E requires two measurements, one for the mold specimen 2 and one for the control test specimen 3.

The method comprises a second step P1 of defining the material 7 to be measured, followed by a step P2 of determining the force M for demolding the material 7 from the control test specimen 3.

The following step P3 consists in calculating the coefficient of material impact C of the material 7 to be measured, this coefficient C being the ratio of the forces $M_0$ for demolding the reference material 6 and M for demolding the control 7 from the control test specimen 3:

$$C=M/M_0.$$

Next, step P4 is the calculation of the force F for demolding the material 7 to be measured from the mold specimen 2 such that $F=C \times F_0$.

For each new material 7 to be measured, all that will be necessary is to define its coefficient of material impact by repeating the method from step P1. It will thus be understood that determining the force for demolding this material from the mold requires only one measurement, that of the force for demolding from the control test specimen, thereby considerably reducing costs.

In order to make it easier to choose a type of tread pattern, a test specimen of the molds can be produced with a top limit and a bottom limit for each variant to be evaluated of a material. The top limit corresponds to easy demolding and the top limit corresponds to difficult demolding.

The following table shows examples of easy (bottom control) and difficult (top control) demolding force values.

| | Bottom control | Variant A | Variant B | Top control |
| --- | --- | --- | --- | --- |
| Test specimen demolding forces (in daN) | 374 | 452 | 472 | 570 |
| Coefficient of test specimen demoldability | 1 | 1.2086 | 1.2620 | 1.5241 |
| Materials used | X | Y | Y | Z |

In this table, the different mold variants have been measured with different materials X, Y and Z. The method makes it possible to use these measurements to define the forces for demolding different materials without requiring new measurements with the different mold variants.

Specifically, it is easy to measure the force for demolding from a control test specimen 3 which is simple, without tread patterns and has a planar shape. This makes it possible to classify the different materials with respect to one another. Thus, if the material X were taken as reference, the following Table T1 would be obtained for example:

| Material analysis test specimen | Compound X | Compound Y | Compound Z |
|---|---|---|---|
| Material demolding forces | 318 | 340 | 404 |
| Coefficient of material impact | 1 | 1.0692 | 1.2704 |

It can thus be seen that material Y generates 7% more forces and material Z 27% more.

By contrast, if Y is taken as reference material, the following Table T2 is obtained:

| Material analysis test specimen | Compound X | Compound Y | Compound Z |
|---|---|---|---|
| Material demolding forces | 318 | 340 | 404 |
| Coefficient of material impact | 0.9353 | 1 | 1.1882 |

It can be seen that material Y generates 19% more forces than Z.

From these measurements, it is possible to extrapolate the demoldability of the different variants using different materials without repeating a set of measurements which would associate variant/compound. It is thus possible to evaluate variants A and B with materials X or Z while the measurements were taken with material Y, the following Table T3 then being obtained for X:

| | Bottom control | Variant A | Variant B | Top control |
|---|---|---|---|---|
| Coefficient of test specimen demoldability | 1 | 1.2086 | 1.2620 | 1.5241 |
| Materials used | X | Y | Y | Z |
| Materials to be evaluated | X | X | X | Z |
| Coefficient of material impact | 1 | 0.9353 | 0.9353 | 1 |
| Coefficient of mold demoldability | 1 | 1.1304 | 1.1803 | 1.5241 |

And the following Table T4 for Z:

| | Bottom control | Variant A | Variant B | Top control |
|---|---|---|---|---|
| Coefficient of test specimen demoldability | 1 | 1.2086 | 1.2620 | 1.5241 |
| Materials used | X | Y | Y | Z |
| Materials to be evaluated | X | Z | Z | Z |
| Coefficient of material impact | 1 | 1.1882 | 1.1882 | 1 |
| Coefficient of mold demoldability | 1 | 1.4361 | 1.4996 | 1.5241 |

It can thus be seen that when the material to be evaluated is identical to the material used on the test specimen, the coefficient of material impact is 1, and when the material to be evaluated is different from that used for the test specimen, the coefficient of material impact is different. In Table T3, it can be seen that using compound X on variants A and B makes it possible to reduce the forces (by around −7%) compared with Y. By contrast, it is found that by using compound Z on variants A and B, the resulting forces are close to the top control (which is the limit not to be exceeded). It is possible to conclude therefrom that either it is necessary to redefine the tread pattern of the different variants or it is necessary to modify the composition of compound Z to reduce the forces. It is therefore possible with this method to predict the demoldability of new tread patterns associated with different compounds without having to repeat a set of specific force measurements for each variant.

Figure 2:
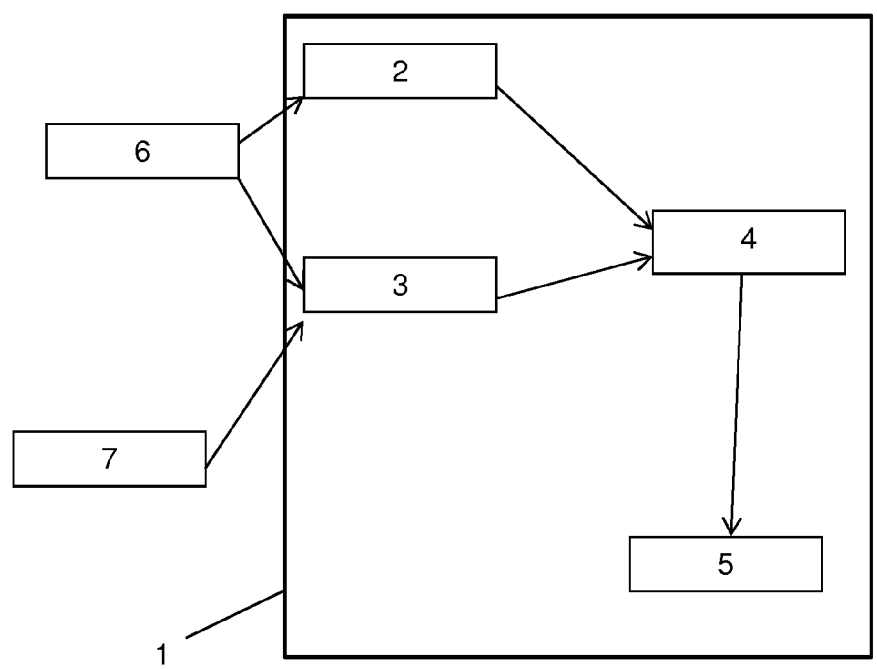
FIG. 2 shows a selection device according to the disclosure.

The device 1 illustrated in FIG. 2 will now be described. This device 1 comprises a mold specimen 2, a control test specimen 3, a force measuring device 4 and a calculating means 5. The device is used to measure the force $F_0$ for demolding a reference material 6 placed in the mold specimen 2 and then the force $M_0$ in the control test specimen 3 by means of the measuring device 4. Said device 1 is then used to measure the force M for demolding the material 7 to be measured and then to use the calculating means 5 to calculate the coefficient C of material impact and the force F for demolding the material 7 from the mold specimen 3.

What is claimed is:
1. A method for evaluating a force for demolding a tire from a mold, consisting in measuring the force for demolding a material from a mold specimen and a control test specimen, said method including the steps of:
   choosing a mold specimen,
   choosing a reference material,
   measuring the force $F_0$ for demolding the reference material from the mold specimen,
   determining the force $M_0$ for demolding the reference material from the control test specimen,
   selecting a material to be measured,
   determining the force M for demolding the material from the control test specimen,
   calculating the ratio of the forces $M_0$ for demolding the reference material and M for demolding the material from the control test specimen so as to define a coefficient C of material impact, and
   calculating the force F for demolding the material such that $F=C \times F_0$.
2. The method according to claim 1 further including the step of measuring a second specimen such that the force $M_1$ for demolding from this second specimen is greater than the force $M_0$.
3. The method according to claim 2, wherein the force $M_0$ for demolding constitutes a lower limit and the force $M_1$ constitutes an upper limit.
4. The method according to claim 1, wherein the evaluation of the force M' for demolding a second material is limited to the following steps of:
   determining the force M' for demolding the second material from the control test specimen,
   calculating the ratio of the forces $M_0$ for demolding the second reference material and M' for demolding the second material from the control test specimen so as to define a coefficient C' of material impact,
   calculating the force F' for demolding the second material such that $F'=C' \times F_0$.
5. The method according to claim 1, wherein the mold specimen is chosen from a region of the mold where the demolding force is greatest.

6. The device for selecting a material/mold pair, wherein it comprises a mold specimen, a control test specimen, a force measuring device and a calculating means and in that it uses the method according to claim 1.

7. A method of selecting a material/mould pair that meets the condition that the force F for demolding the material is less than a predetermined demolding force comprising the steps of claim 1.

* * * * *